T. C. STOWELL.
MACHINE FOR GATHERING AND HUSKING CORN.
APPLICATION FILED MAY 11, 1911.
1,027,013.
Patented May 21, 1912.
3 SHEETS—SHEET 1.
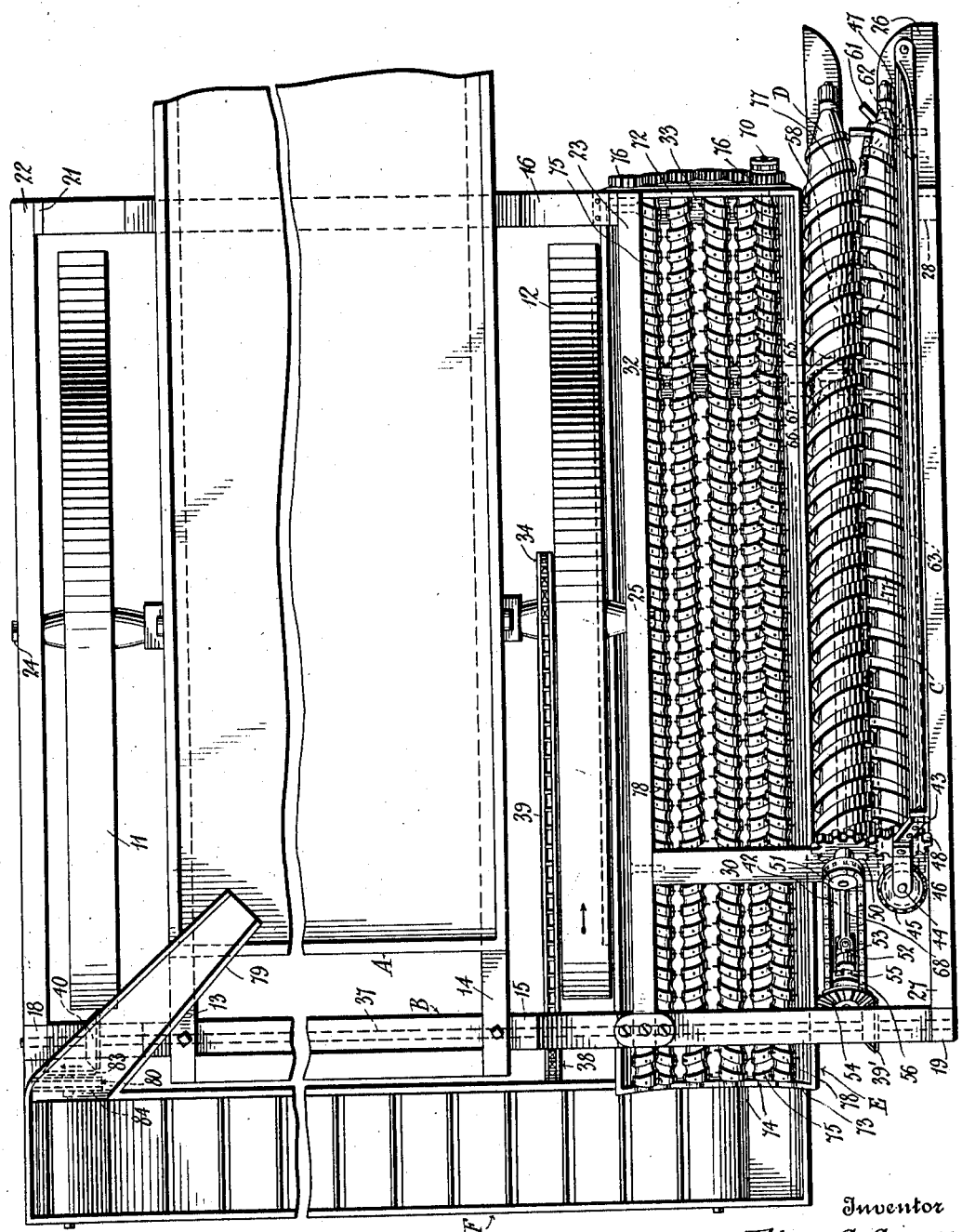

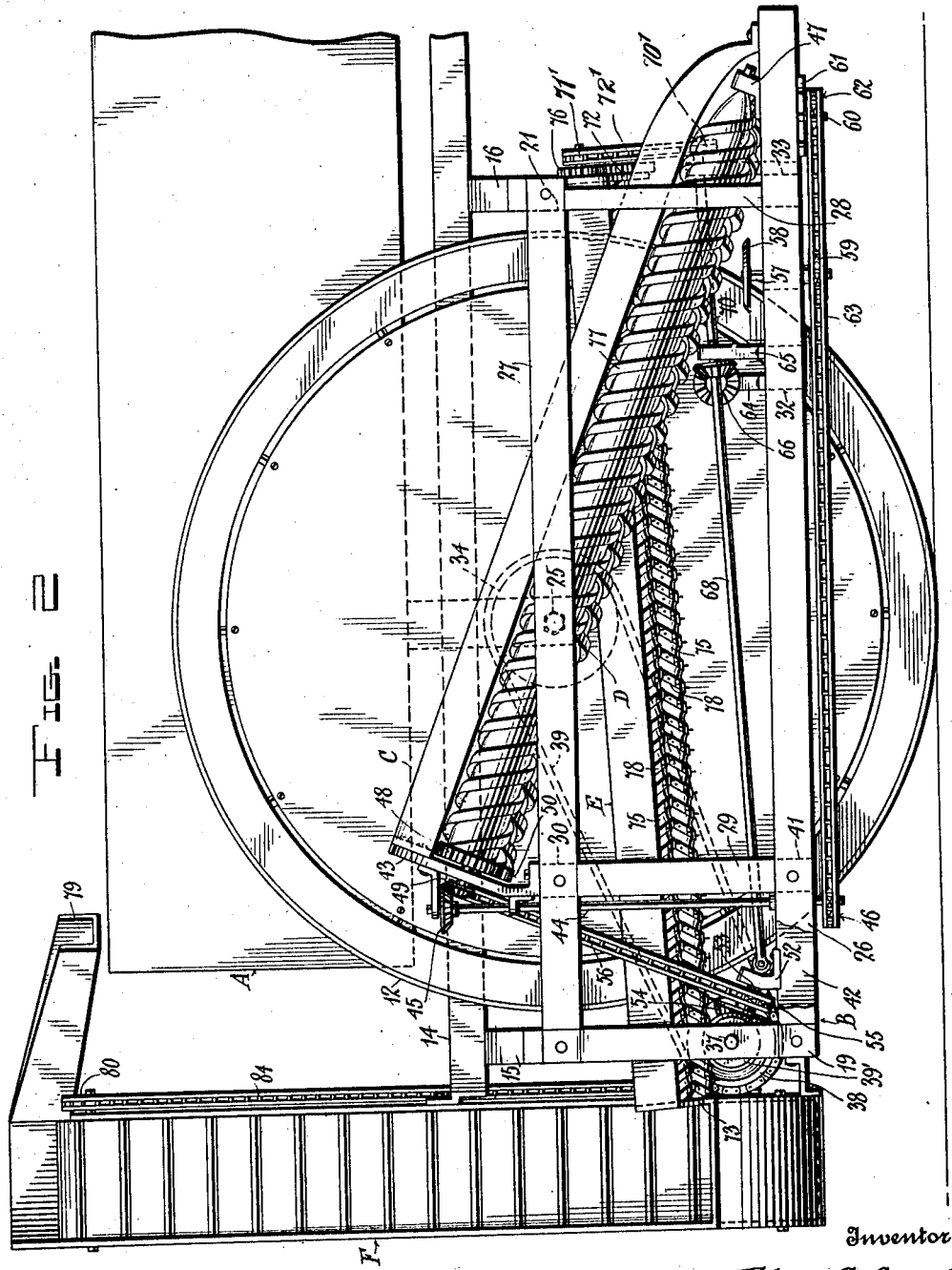

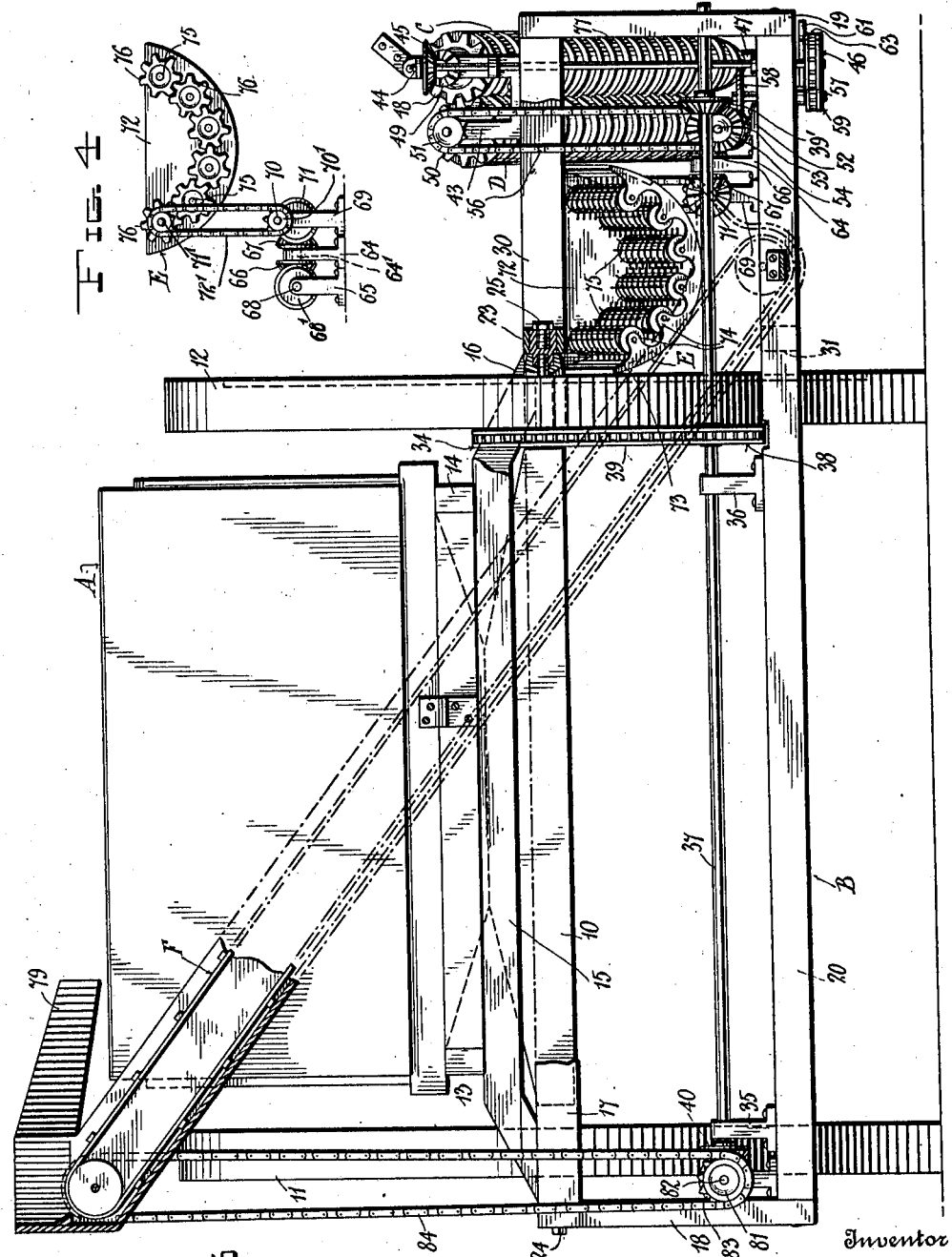

UNITED STATES PATENT OFFICE.

TILTON C. STOWELL, OF MISHAWAKA, INDIANA.

MACHINE FOR GATHERING AND HUSKING CORN.

1,027,013.   Specification of Letters Patent.   Patented May 21, 1912.

Application filed May 11, 1911. Serial No. 626,494.

*To all whom it may concern:*

Be it known that I, TILTON C. STOWELL, a citizen of the United States, residing at Mishawaka, in the county of St. Joseph, State of Indiana, have invented certain new and useful Improvements in Machines for Gathering and Husking Corn; and I do hereby declare the following to be a full, clear, and exact description of the invention, such as will enable others skilled in the art to which it appertains to make and use the same.

This invention relates to machines for gathering and husking corn.

The object of the invention resides in the provision of a machine of the character named which may be easily associated with a wagon of ordinary construction so as to be adapted for automatic operation during the travel of the wagon through the instrumentality of suitable connections with the traction elements of said wagon; said machine including means whereby the corn gathered and husked thereby will be delivered into the wagon to which the same is attached.

A further object of the invention resides in providing an improved form of snapping rolls to be included in said machines and in providing generally an improved construction for machines of this character.

With these and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views; and in which—

Figure 1 is a plan view of a corn gathering and husking machine embodying the invention, the same being shown associated with a wagon of ordinary construction and the latter being broken away centrally. Fig. 2 a side elevation of what is shown in Fig. 1. Fig. 3 an end view looking at the rear of the wagon, with certain parts of the corn gathering and husking machine shown in dotted lines and other parts in section and elevation, and Fig. 4 a front end view of the frame supporting the husking rolls and showing the manner of actuating said rolls.

Referring to the drawings, A indicates generally the rear end of a wagon of ordinary construction provided with the rear axle 10. Upon the ends of the axle 10 are journaled rear traction wheels 11 and 12. Detachably supported by the wagon A is the frame B of the machine. This frame is directly connected to the front and rear bolsters of the wagon A by means of beams 13 and 14. Carried by the beams 13 and 14 at the rear of the traction wheels 11 and 12 is a suspending member 15. Another suspending member 16 is carried by the beams 13 and 14 forward of the traction wheels 11 and 12 and both of said suspending members are disposed transversely of the wagon as will be apparent. Secured to the terminals of the suspending member 15 and disposed transversely of the wagon A is a beam 17, one end of which projects a considerable distance beyond the outer face of the traction wheel 12. Depending from opposite ends of the beam 17 are vertical beams 18 and 19 respectively which have their lower ends connected by a beam 20 disposed parallel to the beam 17. Secured to the terminals of the suspending member 16 is a beam 21 which extends parallel to the beam 17 and terminates short thereof at the end adjacent the traction wheel 12. The terminals of the beam 21 are connected with the beam 17 by members 22 and 23 which are supported intermediately respectively by securing nuts 24 and 25 of respective traction wheels 11 and 12 which nuts extend through respective beams 22 and 23. Extending forwardly from the end of the beam 20 adjacent the traction wheel 12 is a beam 26, while another beam 27 extends forwardly from the end of the beam 17 adjacent the traction wheel 12 and is disposed parallel to the beam 26. The beams 26 and 27 are connected at their forward ends by a vertical member 28 and near their rear ends by a vertical member 29. Connecting the beams 23 and 27 in the same plane as the member 29 is a member 30. Having one end secured to the beam 20 and extending forwardly thereof parallel to the beam 26 and adjacent the outer face of the traction wheel 12 is a beam 31 the forward end of which is suitably connected to the beam 21. Connecting the beams 26 and 31 is a cross member 32, while a bracket 33 is secured to the beam 31 and extends toward the beam 26 but terminates short of the latter.

Fixed on the inner side of the wheel 12 is a sprocket wheel 34 which serves as a connection for transmitting power to the machine during the travel of the wagon A. Mounted upon the beam 20 are journal brackets 35 and 36, and rotatably arranged in these brackets and in the beam 19 is a shaft 37. Fixed upon this shaft in line with the sprocket wheel 34 is a sprocket wheel 38, and traveling upon the sprocket wheels 34 and 38 is a sprocket chain 39 through the medium of which the shaft 37 is rotated during the travel of the wagon. Fixed upon the shaft 37 adjacent the member 19 is a beveled gear 39′ while another beveled gear 40 is fixed upon the end of said shaft which extends beyond the journal bracket 35. Connecting the beams 26 and 31 adjacent the beam 20 is a cross beam 41, while another beam 42 connects said cross beam 41 with the beam 20. Mounted upon the member 30 is a bracket 43 and extending from this bracket and from the cross beam 41 are suitable journal bearings in which is rotatably mounted a vertical shaft 44. The upper end of this shaft 44 has fixed thereon a beveled gear 45 while the lower end thereof which extends beneath the beam 26 has fixed thereon a sprocket wheel 46. Rotatably mounted in the bracket 43 and a bracket 47, the latter of which is fixed to the forward end of the beam 26, is a snapping roll C, the uppermost trunnion of which bears in the bracket 43 and has fixed thereon a gear wheel 48 and a beveled gear 49, the latter of which meshes with the beveled gear 45. Journaled in the bracket 43 and in a suitable bearing supported from the beam 31 is another snapping roll D which coöperates with the snapping roll C. The uppermost trunnion of the snapping roll D has fixed thereon a gear wheel 50, meshing with the gear wheel 48 of the snapping roll C, and a sprocket wheel 51. Mounted upon the beam 42 is a bracket 52 which has journaled therein a shaft 53. Fixed upon this shaft 53 is a beveled gear 54 which meshes with the beveled gear 39′. Also fixed upon the shaft 53 between the beveled gear 54 and the bracket 52 is a sprocket wheel 55 and traveling upon this sprocket wheel and the sprocket wheel 51 is a sprocket chain 56. Rotatably mounted in a bracket supported from the beam 26 is a shaft 57 which has fixed on its upper end a knife 58 and on its lower end a sprocket wheel 59, the knife 58 being disposed between the snapping rolls C and D so as to engage and sever the corn stalks as they pass between the snapping rolls. Journaled in a suitable bracket supported from the forward end of the beam 26 is another shaft 60 which has fixed thereon a toothed feeding wheel 61 and a sprocket wheel 62, said toothed feeding wheel being adapted during its rotation to travel across the opening between the lower ends of the snapping rolls. Traveling upon the sprocket wheels 46 and 62 and operatively engaging the sprocket wheel 59 is a sprocket chain 63 through the instrumentality of which the knife 58 and the feed wheel 61 are operated when the shaft 44 is rotated.

Mounted upon the member 32 of the frame are brackets 64 and 65 in the former of which is rotatably supported a stub shaft 64′ having fixed on each end thereof beveled gears 66 and 67. Rotatably supported in the bracket 65 is one end of a shaft 68, the other end of which is connected to the shaft 53 by a universal joint. Supported upon the member 32 inwardly of the bracket 65 is another bracket 69 in which is rotatably mounted one end of a shaft 70. The other end of this shaft 70 is rotatably supported in the bracket 33. A beveled gear 71 is fixed on the shaft 70 and meshes with the beveled gear 67, while a bevel gear 68′ fixed on the shaft 68 meshes with the gear 66 fixed on the shaft 64′. By this construction it will be apparent that upon the rotation of the shaft 68 the shafts 64′ and 70 will be in turn rotated. The shaft 70 has fixed on its outer end a sprocket wheel 70′.

Suitably supported by the frame B between the traction wheel 12 and the snapping rolls C and D is a husking roll supporting frame E. This frame is inclined toward the rear of the wagon A so that product treated by the husking rolls carried thereby will be delivered from the rear end thereof. This frame E includes a forward end member 72 which closes the forward end of the frame, and a rear end member 73 which is formed with a plurality of ears 74 corresponding in number to the number of husking rolls supported by the frame E. Journaled in each of the ears 74 and the end member 72 is a husking roll 75. The forward trunnions of each of the husking rolls 75 is extended through the end member 72 and has fixed thereon a gear 76, the gears 76 on the trunnions of adjacent husking rolls meshing with each other whereby the rotation of one of the rolls will simultaneously rotate all. The forward trunnion of the husking roll 75 which is disposed in substantially the same vertical plane with the shaft 70 has fixed thereon a sprocket wheel 71′ disposed in operative relation to the sprocket wheel 70′ and traveling upon the sprocket wheels 70′ and 71′ is a sprocket chain 72′. By this construction it will be apparent that the rotation of the shaft 70 will effect a simultaneous rotation of all of the husking rolls.

The snapping rolls C and D are of spiral groove formation, each of the rolls being provided with four spirals. The rolls are so positioned that the spirals of one roll are directed into the resultant groove of the coöperating roll and the entire faces of said rolls are provided with the stalk engaging spirals 77. Likewise the husking rolls 75 are of spiral groove formation and have their faces provided with husk engaging projections 78.

As the wagon A travels over the ground the rotation of the wheel 12 will be transmitted to the shaft 37 through the medium of the sprocket wheels 34 and 38 and the sprocket chain 39. This rotation of the shaft 37 will be transmitted through the beveled gears 39' and 54 to the shaft 53, and the rotation of this shaft will simultaneously operate the snapping rolls, husking rolls, knife 58 and guide wheel 61 through the medium of the various connections heretofore described. The husking rolls 75 deliver to an endless conveyer F which is suitably supported at the rear end of the wagon transversely of the latter by the frame B. This conveyer F has provided at its upper end a spout 79 so positioned as to properly deliver the product into the body of the wagon A. The upper shaft of the conveyer F carries a sprocket wheel 80 which alines with another sprocket wheel 81 fixed on a shaft 82 rotatably mounted in a suitable bearing carried by the frame B. This shaft 82 also has fixed thereon a beveled gear 83 which meshes with the beveled gear 40. Traveling on the sprocket wheels 80 and 81 is a sprocket chain 84 which serves to transmit the rotation of the shaft 37 to the conveyer F during the travel of the wagon as will be apparent.

It will be noted that the snapping roll C is supported at a greater elevation than the snapping roll D so as to positively force the product toward the husking mechanism. It will be further observed that the helicoidal ridges and resultant grooves of the snapping rolls positively move the products between same during the operation of the machine and adds to the efficiency of the device as a whole.

What is claimed is:

In a machine of the class described, the combination with a vehicle, of a frame detachably supported by said vehicle and having a portion thereof extending laterally of the vehicle, a snapping mechanism carried by the laterally extending portion of the frame, a drive shaft carried by the frame, connections between the drive shaft and one of the traction wheels of the vehicle for rotating said drive shaft, a second shaft operatively connected with said drive shaft, connections between the second shaft and the snapping mechanism, a husking mechanism also carried by the laterally extending portion of the frame and disposed adjacent the snapping mechanism for receiving material from the latter, said husking mechanism comprising a plurality of rolls arranged side by side, connections between said husking rolls whereby the rotation of one of said rolls will simultaneously rotate the remainder, a sprocket wheel fixed on a trunnion of one of said husking rolls, a shaft mounted longitudinally of the laterally extending portion of the frame, connections between said longitudinally disposed shaft and the second named shaft, a beveled gear fixed on the longitudinally disposed shaft, a stub shaft journaled in said frame, a beveled gear fixed on said stub shaft meshing with the beveled gear on the longitudinally disposed shaft, and connections between the stub shaft and the sprocket wheel on the trunnion of the husking roll whereby the rotation of said stub shaft will rotate said husking roll.

In testimony whereof, I affix my signature, in presence of two witnesses.

TILTON C. STOWELL.

Witnesses:
WM. P. O'NEILL,
KATHERINE E. DIROLL.

Copies of this patent may be obtained for five cents each, by addressing the "Commissioner of Patents Washington, D. C."